United States Patent
Wang et al.

(10) Patent No.: US 8,300,729 B2
(45) Date of Patent: Oct. 30, 2012

(54) METHODS AND APPARATUS FOR REDUCING HIGH-FREQUENCY EVENTS IN POLAR DOMAIN SIGNALS

(75) Inventors: Hua Wang, San Mateo, CA (US); Paul Cheng-Po Liang, Santa Clara, CA (US)

(73) Assignee: Panasonic Corporation, Osaka (JP)

( * ) Notice: Subject to any disclaimer, the term of this patent is extended or adjusted under 35 U.S.C. 154(b) by 881 days.

(21) Appl. No.: 12/414,016

(22) Filed: Mar. 30, 2009

(65) Prior Publication Data
US 2010/0246716 A1 Sep. 30, 2010

(51) Int. Cl.
*H03C 3/00* (2006.01)
*H04L 27/12* (2006.01)

(52) U.S. Cl. ........ 375/302; 375/296; 375/298; 375/299; 375/300

(58) Field of Classification Search .................. 375/296, 375/298, 302
See application file for complete search history.

(56) References Cited

U.S. PATENT DOCUMENTS

| | | | |
|---|---|---|---|
| 7,054,385 B2 * | 5/2006 | Booth et al. | 375/300 |
| 7,839,954 B1 * | 11/2010 | Lee | 375/302 |
| 8,010,063 B2 * | 8/2011 | Mow et al. | 455/102 |
| 2008/0002788 A1 * | 1/2008 | Akhtar et al. | 375/298 |

* cited by examiner

*Primary Examiner* — David Ometz
*Assistant Examiner* — Qutbuddin Ghulamali

(57) ABSTRACT

Methods and apparatus for reducing high-frequency events in polar domain signals. An exemplary method includes first generating an unmodified rectangular-coordinate signal having in-phase (I) and quadrature phase (Q) components that are modulated according to a predetermined modulation scheme. Next a first sample of the unmodified rectangular-coordinate signal is modified based on how close the first sample is to the origin in the complex signal plane and how fast a signal trajectory between the first sample and a subsequent sample changes. Finally, the modified rectangular-coordinate signal is converted to a polar domain signal having amplitude and phase components. By modifying the first sample in this manner, either or both the amplitude and phase components have reduced high-frequency content compared to a polar domain signal that would be generated without the first sample having been first modified.

16 Claims, 14 Drawing Sheets

METHODS AND APPARATUS FOR REDUCING HIGH-FREQUENCY EVENTS IN POLAR DOMAIN SIGNALS

FIELD OF THE INVENTION

The present invention relates to communications systems and methods. More specifically, the present invention relates to methods and apparatus for reducing high-frequency events in polar domain signals, such as are used in polar transmitters.

BACKGROUND OF THE INVENTION

Satisfying consumer demand for mobile handset applications, like streaming video, mobile e-mail, web browsing, etc., requires mobile telecommunications systems that support high data rates. Unfortunately, the radio frequency (RF) spectrum is a limited and highly regulated resource, which makes developing mobile telecommunications systems that support these data-intensive applications tremendously challenging. To increase data throughput in a given amount of RF spectrum, various techniques have been, and continue to be, developed, including modulation schemes that are more spectrally efficient and communication protocols that allow mobile handsets and base stations to communicate with reduced latency.

In second generation (2G) Global System for Mobile Communications (GSM) telecommunications systems, data rates are increased by using either the General Packet Radio Service (GPRS) or the Enhanced Data Rates for GSM Evolution (EDGE) service (often referred to as 2.5G and 2.75G technologies). GSM, GPRS and EDGE utilize time division multiple access (TDMA), a channel access method that allows several users to share the same frequency channel. Transmitters transmit in rapid succession, one burst after the other, each according to pre-assigned time slots of a TDMA frame. This allows each transmitter to share the same radio frequency channel while using only part of the channel's total capacity. GSM supports data rates of up to only 14.4 kilobits per second (Kbps), allowing only one data slot per TDMA frame. GPRS enhances data throughput (up to a theoretical limit of 115 Kbps) by allowing eight data slots per TDMA frame. EDGE further enhances data throughput (up to a theoretical limit of 474 Kbps) by also utilizing eight data slots per TDMA frame and further employing a higher order modulation scheme (8 phase shift keying (8PSK)).

Third generation (3G) systems, such as the Universal Mobile Telecommunications System (UMTS) and the Freedom of Mobile Multimedia Access (FOMA) system deployed in Japan, achieve increased data rates by using the Wideband Code Division Multiple Access (W-CDMA) air interface. W-CDMA employs a 5 MHz channel bandwidth, compared to the 200 KHz channel bandwidth used in GSM systems. The increased channel bandwidth, together with a more spectrally efficient non-constant envelope modulation scheme, allows data rates as high as 2 megabits per second (Mbps) to be achieved.

Data throughput can be further increased in 3G systems by employing High Speed Uplink Packet Access (HSUPA) or High Speed Downlink Packet Access (HSDPA). HSDPA employs adaptive modulation and coding (AMC)—a technique that utilizes one of two different non-constant envelope modulation schemes depending on the quality of the radio link between a mobile handset and a base station. When the radio link is poor, QPSK modulation scheme is used. However, when the radio link is good, 16 quadrature amplitude modulation (16QAM) is used. 16QAM is a higher order modulation scheme than QPSK, and its use nearly doubles the data rate over that achievable using QPSK. Data rates are also increased by fast packet scheduling at the base station and fast retransmissions from the base station, known as hybrid automatic repeat-request (HARQ). Similar techniques are used to increase data rates in HSUPA. By using AMC and the refined handset to base station protocols, a theoretical downlink (base station to handset) performance of 14.4 Mbps can be achieved using HSDPA, while a theoretical uplink performance of 5.76 Mbps can be achieved using HSUPA. These data rates rival or even exceed land-based digital subscriber line (DSL) technology, and allow broadband Internet and video calling capabilities.

Although the non-constant envelope modulation schemes used in 3G systems are more spectrally efficient than constant envelope modulation schemes, their use introduces a number of problems. One especially significant problem relates to energy efficiency. In conventional quadrature-modulator-based transmitters power must be backed off in order to prevent clipping of the signal peaks of non-constant envelope signals. Power back-off is achieved by biasing the transmitter's power amplifier (PA) so that the PA is forced to operate in its linear region of operation, over the full range of output powers the PA must be configured to operate. In a typical design, this is achieved by biasing the PA so that its peak output power does not exceed the PA's 1 dB compression point, which defines the input power at which the gain of the PA drops by 1 dB from its ideal, linear response value. The degree of power back-off required depends on the peak-to-average ratio (PAR), which in turn depends on the particular non-constant envelope modulation scheme being used. The higher the PAR, the more the output power of the PA must be backed off. For example, for a PAR of 3 dB, an average power of 10 dBm, and a peak output power of 13 dBm, a linear PA response requires that the average output power of the PA be backed off by at least 3 dB in order for the peak output power not to exceed the 1 dB compression point.

Employing power back-off does help to ensure PA linearity. However, it also undesirably results in a significant reduction in energy efficiency. The energy efficiency of a transmitter is determined in large part by how efficient the transmitter's PA is. The efficiency of a PA is defined as the ratio of the PA RF output power to the direct current (DC) power supplied to the PA. Efficiency is therefore high when the PA is operating at a high RF output power, but low when the PA is operating at low RF output powers. In most any practical application, the PA operates at high or peak RF output powers only for very short periods of time. For all other times, the RF output power is backed off. Consequently, power back-off results in a substantial reduction in energy efficiency.

The low energy efficiency of conventional quadrature-modulator-based transmitters is a major problem, particularly in a mobile handset since the handset's transmitter and PA are battery-powered. Fortunately, a more efficient type of communications transmitter known as a polar transmitter is available. As explained below, in a polar transmitter the amplitude information (i.e., the signal envelope) is temporarily removed from the non-constant envelope signal. This affords the ability to operate the polar transmitter's PA in its nonlinear region, where it is more efficient at converting energy from the transmitter's power supply into RF power than it is when configured to operate in its linear region.

FIG. 1 is a drawing showing the basic elements of a typical polar transmitter 100. The polar transmitter 100 comprises a symbol mapper 102; an oversampling block 104; a pulse shaping filter 106; a Coordinate Rotation Digital Computer (CORDIC) converter 108; an amplitude path including an amplitude path digital-to-analog converter (DAC) 110 and an envelope modulator 112; a phase path including a phase path DAC 114 and a phase modulator 116; an RF PA 118; and an antenna 120. Collectively, the symbol mapper 102, oversampling block 104 and pulse shaping filter 106 form a baseband modulator 101. The symbol mapper 102 operates to map data bits in a digital message to be transmitted to a signal constellation defined by an applicable modulation scheme, according to a symbol clock, to produce an in-phase sequence of symbols I(n) and a quadrature phase sequence of symbols Q(n). The oversampling block 104 increases the data rate of the I(n) and Q(n) sequences of symbols by a rate determined by an oversampling clock, to increase resolution and eliminate the need for (or at least relax the requirements of) subsequent reconstruction filters (not shown). The pulse shaping filter 106 (e.g., a root-raised-cosine filter) pulse shapes the oversampled I and Q sequences of symbols to band-limit the signals and reduce inter-symbol interference.

The digital pulse-shaped I(t) and Q(t) signals produced at the output of the baseband modulator 101 are converted from rectangular to polar coordinates by the CORDIC converter 108. The amplitude and phase path DACs 110 and 114 convert the resulting amplitude and phase component signals $\rho(t)$ and $\theta(t)$ to analog amplitude and phase modulation signals. In the amplitude path, the envelope modulator 112 modulates a direct current power supply voltage Vsupply (e.g., as provided by a battery) according to the amplitude information in the amplitude modulation signal. The resulting amplitude-modulated power supply signal Vs(t) is coupled to the power supply port of the PA 118. In the phase path, the phase modulator 116 operates to modulate an RF carrier signal according to the phase information in the phase modulation signal, to produce a phase-modulated RF carrier signal which is coupled to the RF input port RFIN of the PA 118.

Because the phase-modulated RF carrier signal has a constant envelope, the PA 118 can be operated in its nonlinear region of operation without the risk of signal peak clipping. Typically, the PA 118 is implemented as a switch-mode PA operating between compressed and cut-off states. When configured in this manner, the envelope information in the amplitude-modulated power supply signal Vs(t) is restored at the RF output RFOUT of the PA 118, as the PA 118 amplifies the phase-modulated RF carrier signal. The desired amplitude- and phase-modulated RF carrier signal appearing at the RF output RFOUT of the PA 118 is coupled to the antenna 120, which finally radiates the signal over the air to a remote receiver (e.g., a base station).

While polar transmitters are able to process and transmit non-constant envelope signals at higher efficiencies than can be realized in more conventional quadrature-modulator-based transmitters, the amplitude and phase component signals $\rho(t)$ and $\theta(t)$ typically have higher signal bandwidths compared to the rectangular-coordinate I(t) and Q(t) signals. This so-called "bandwidth expansion" phenomenon occurs during the rectangular-to-polar conversion process performed by the CORDIC converter 108, resulting in amplitude and phase component signals $\rho(t)$ and $\theta(t)$ containing high-frequency events. These high-frequency events are undesirable, since they can cause the transmission spectrum to extend beyond the limits of the intended band-limited channel, resulting in adjacent channel interference and an increase in receive band (Rx band) noise.

High-frequency events also have an impact on modulation accuracy. Accurate representation of high-frequency events necessitates a high signal processing rate. Not only does this result in increased energy consumption, in situations where the required signal processing rate exceeds the capabilities of the underlying hardware substantial in-band signal distortion occurs.

When high-frequency events are present in the amplitude component signal $\rho(t)$, the envelope modulator 112 is unable to accurately track the signal envelope. One reason for this is that the envelope modulator 112 is usually implemented as a switch-mode power supply containing power transistors that are operated as switches. Due to their large gate capacitances, these power transistors have a limited switching speed. This constrains the bandwidth handling capability of the envelope modulator 112. Accordingly, high-frequency events in the amplitude component signal $\rho(t)$ that are beyond the bandwidth handling capability of the envelope modulator 112 result in degraded modulation accuracy.

High-frequency events in the phase component signal $\theta(t)$ that exceed the bandwidth handling capability of the phase modulator 116 also degrade modulation accuracy. In a digital polar transmitter implementation, the phase is carried through the phase path of the polar transmitter 100 as the phase difference $\Delta\theta$ between sample clocks. A voltage-controlled oscillator (VCO) within the phase modulator 116 integrates the phase-difference $\Delta\theta$ in successive samples to produce the desired phase-modulated RF carrier signal. The phase-difference $\Delta\theta$ determines how fast the VCO must integrate. When high-frequency events are present in the phase component signal $\theta(t)$, the phase-difference $\Delta\theta$ between sample clocks can be large enough that it exceeds the bandwidth handling capability of the VCO. Under these conditions, the signal phase of the phase-modulated RF carrier signal ends up lagging or leading the desired signal phase and phase accumulation error results. The phase accumulation error manifests itself as phase jitter at the output of the phase modulator 116 and results in degraded modulation accuracy.

Various techniques have been proposed to mitigate the effects of high-frequency events in polar domain signals. One commonly-used approach, known as "hole blowing," operates on the assumption that low amplitude I-Q samples correlate in time with high-frequency events in the polar domain. The rationale for this assumption is illustrated in FIG. 2, which is a simplified drawing of a signal trajectory of a non-constant envelope signal in the quadrature domain. As shown, as the signal traverses closer and closer to the origin, the magnitude of the signal approaches zero. When the signal eventually passes through the origin, a near 180° phase change occurs. This abrupt change in phase is indicative of a high-frequency event. To prevent this from occurring, hole blowing algorithms operate to condition low-magnitude samples that fall below a predetermined low-magnitude threshold $\alpha$, so that the conditioned samples fall on a point on a circle (i.e., hole) centered at the origin and having a radius equal to the predetermined low-magnitude threshold $\alpha$ (see FIG. 3). By doing this, the signal trajectory is altered so that the signal does not pass too close to the origin.

While hole blowing can be an effective in some applications, it can be detrimental in others. The problem relates to the assumption that low-magnitude events always provide an indication of high-frequency content. This is not necessarily the case. For example, as illustrated in FIG. 4, while low-magnitude events 1 and 2 in the amplitude component signal $\rho(t)$ are seen to correspond to high-frequency events 1 and 2 in the phase-difference component signal $\Delta\theta$, low-magnitude event 3 in the amplitude component signal $\rho(t)$ does not correspond to any high-frequency event in the phase-difference component signal $\Delta\theta$. Such a condition may arise for signal constellations that have constellation points near or at the origin, such as the signal constellation of the exemplary HSDPA signal shown in FIG. 5. With a constellation point at the origin, naturally the HSDPA has a high probability of low-magnitude events. However, if conventional hole blowing were to be applied to the signal, modulation accuracy would be substantially compromised.

Another problem with conventional hole blowing is that it ignores high-frequency events that do not have any correspondence with low-magnitude events. As shown in FIG. 6, high-frequency events 1 and 2 in the phase-difference component signal $\Delta\theta$ do not correlate with any low-magnitude events in the amplitude component signal $\rho(t)$. Such a condition is seen to occur in signal constellation similar to that shown in FIG. 7, which is signal trajectory diagram of an exemplary HSUPA signal. Note that in addition to the abrupt changes in phase that occur at the origin, other high-frequency events occur between inner constellation points and peripheral constellation points. Conventional hole blowing techniques are unable to detect and correct for those high-frequency events.

Considering the foregoing limitations and deficiencies of conventional hole blowing approaches, it would be desirable to have methods and apparatus that are more effective at reducing high-frequency events in non-constant envelope polar domain signals.

SUMMARY OF THE INVENTION

Methods and apparatus for reducing high-frequency events in polar domain signals are disclosed. An exemplary method includes first generating an unmodified rectangular-coordinate signal having in-phase (I) and quadrature phase (Q) components that are modulated according to a predetermined modulation scheme. Next a first sample of the unmodified rectangular-coordinate signal is modified based on how close the first sample is to the origin in the complex signal plane and how fast a signal trajectory between the first sample and a subsequent sample changes. Finally, the modified rectangular-coordinate signal is converted to a polar domain signal having amplitude and phase components. By modifying the first sample in this manner, either or both the amplitude and phase components have reduced high-frequency content compared to a polar domain signal that would be generated without the first sample having been first modified.

An exemplary baseband circuit suitable for use in a transmitter (such as, for example, a polar transmitter) is also disclosed. The exemplary baseband circuit includes a baseband modulator, a high-frequency detection and reduction circuit, and a rectangular-to-polar converter. The baseband modulator is configured to generate I and Q signals from a digital message to be transmitted, in accordance with a predetermined modulation scheme. The high-frequency detection and reduction circuit, which may be configured in either a feedforward or feedback arrangement, is configured to detect a first sample of the I and Q signals that corresponds to a high-frequency event in the polar domain, and modify the first sample based on both how close the first sample is to the origin of the complex signal plane and how fast a signal trajectory between the first sample and a subsequent sample changes. The modified I and Q signals are then converted to the polar domain by the rectangular-to-polar converter. By modifying the I and Q signals prior to conversion to the polar domain, the amplitude and phase components of the polar domain signal following the rectangular-to-polar process have reduced high-frequency content compared to if the I and Q signals were not first modified prior to conversion to the polar domain.

The high-frequency detection and reduction methods and apparatus of the present invention avoid the problems that plague conventional hole blowing approaches. The methods and apparatus of the present invention neither operate on the false assumption that low-magnitude events always provide an indication of high-frequency content in the polar domain nor ignore high-frequency events that have no correspondence with low-magnitude events.

Before describing exemplary embodiment of the invention in detail, it should be emphasized that the methods and apparatus of the present invention are not limited to reducing high-frequency events in polar domain signals produced by any particular modulation scheme. They may be applied to reduce high-frequency events in polar domain signals in polar transmitters configured to operate in accordance with third generation (3G) Wideband Code Division Multiple Access (W-CDMA) cellular communication modulation schemes, High Speed Packet Access (HSPA), orthogonal frequency-division multiple access (OFDMA) modulation schemes employed in Wireless Metropolitan Area Networks (WiMAX), and the impending next generation Long Term Evolution (LTE) Universal Mobile Telecommunications System (UMTS) upgrade (i.e., High Speed OFDM Packet Access (HSOPA)). Finally, while the exemplary embodiments in the detailed description that follow are described in the context of radio frequency (RF) polar transmitters, the methods and apparatus of the invention are not limited to polar transmitters or to RF applications. They may be used in any type of transmitter that processes signals in the polar domain, and may be adapted for use in wired transmitters, such as those configured to transmit over a cable or fiber optic link.

Further features and advantages of the present invention, including a description of the structure and operation of the above-summarized and other exemplary embodiments of the invention, will now be described in detail with respect to accompanying drawings, in which like reference numbers are used to indicate identical or functionally similar elements.

DETAILED DESCRIPTION

Figure 1:
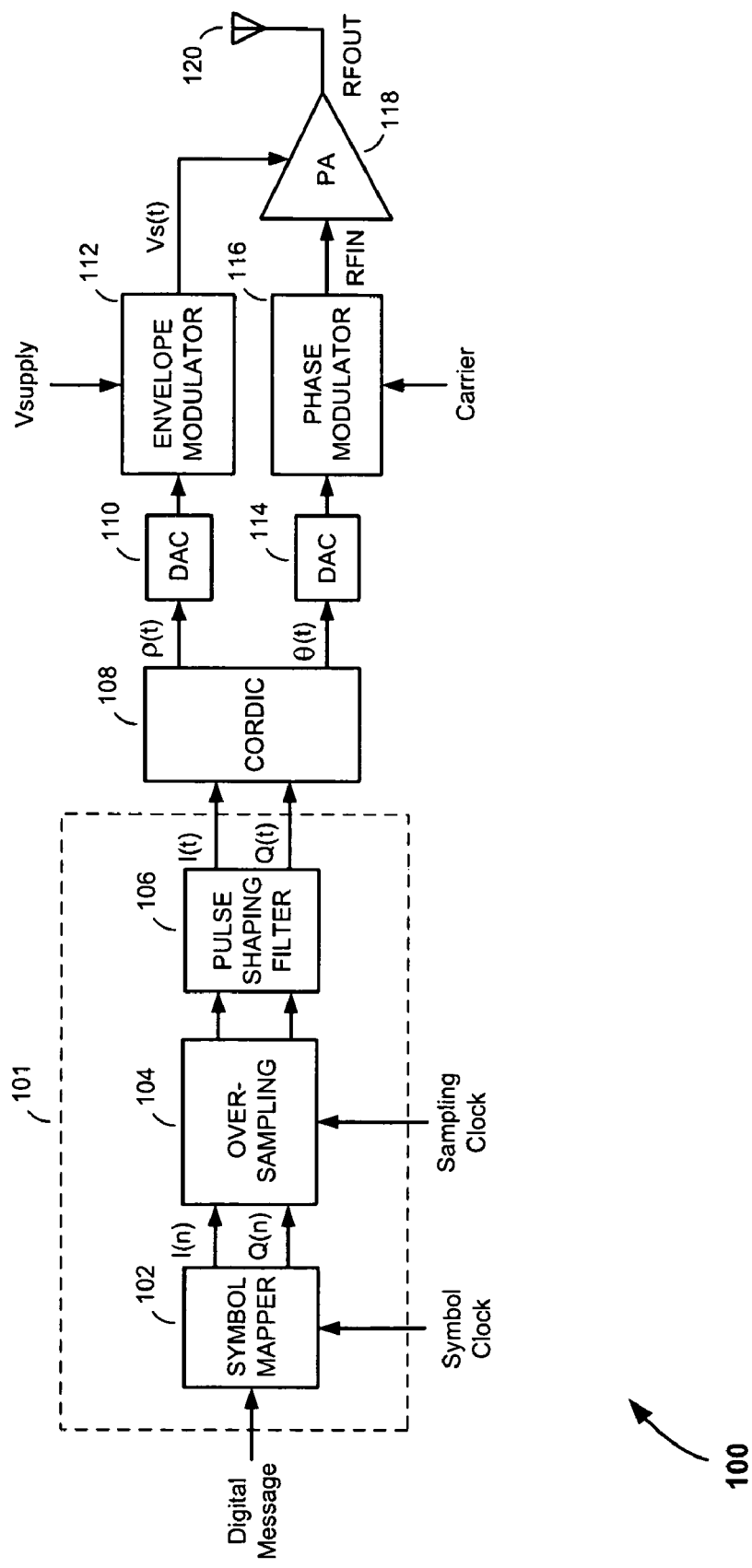
FIG. 1 is a simplified drawing of a conventional polar transmitter.
Figure 2:
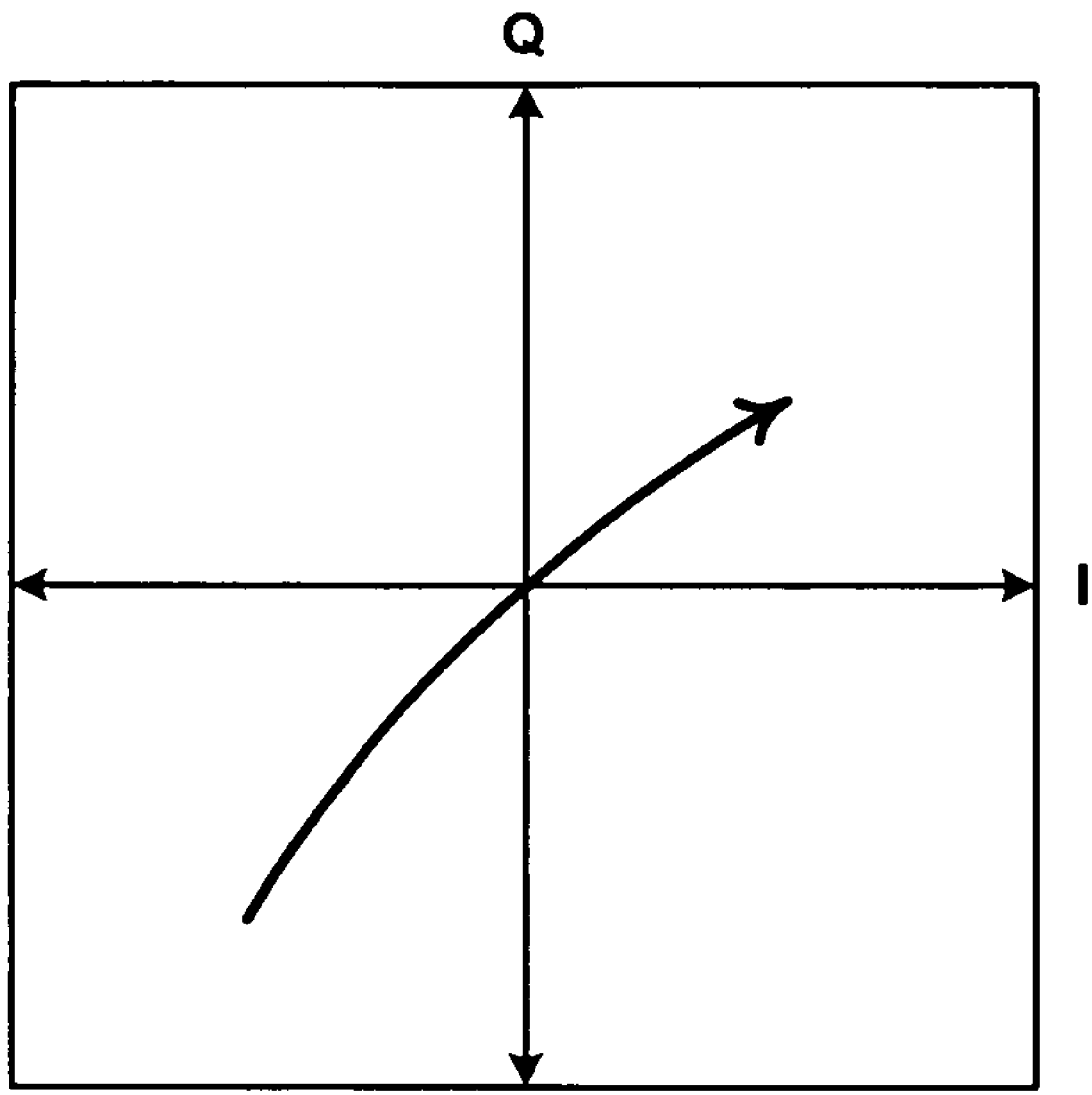
FIG. 2 is a drawing of a signal trajectory in the in-phase quadrature phase (I-Q) signal plane (i.e., the complex signal plane) that passes through the origin.
Figure 3:
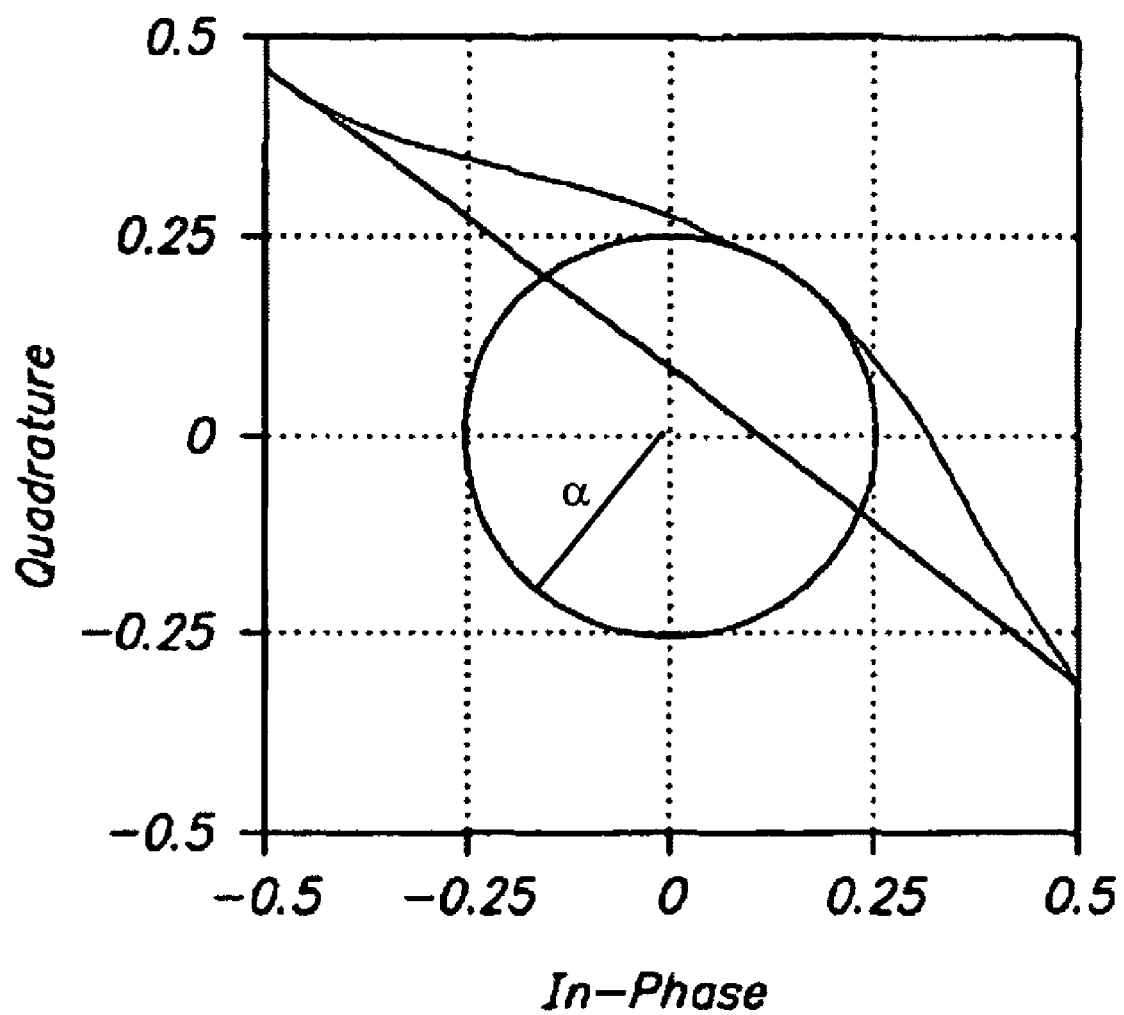
FIG. 3 is a drawing of a signal trajectory in the I-Q signal plane that has been altered by a conventional hole blowing algorithm.
Figure 4:
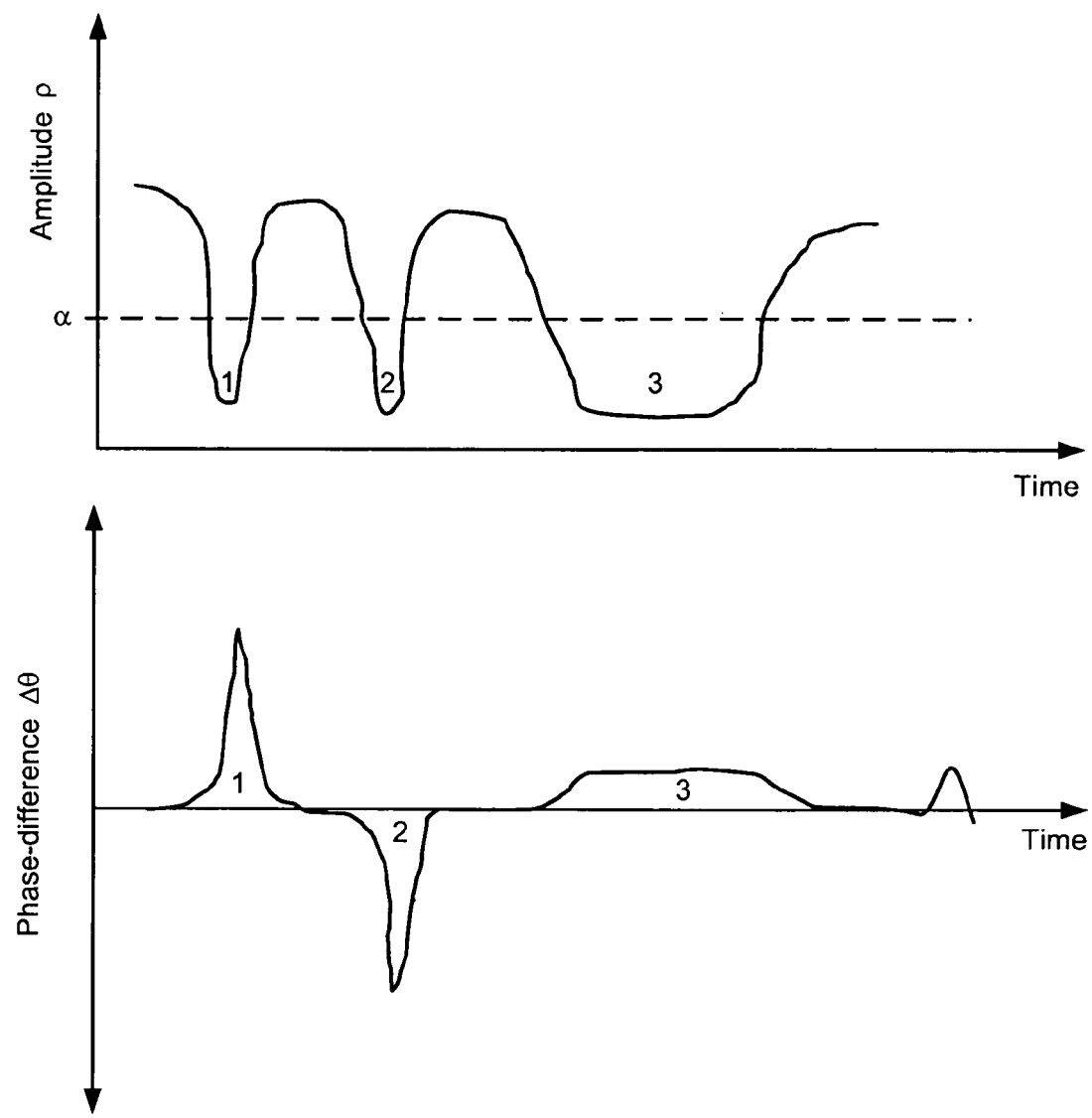
FIG. 4 is a signal diagram of the amplitude and phase-difference components $\rho$ and $\Delta\theta$ of a polar domain signal, highlighting the fact for some modulation schemes low-magnitude events do not always correspond to high-frequency events.
Figure 5:
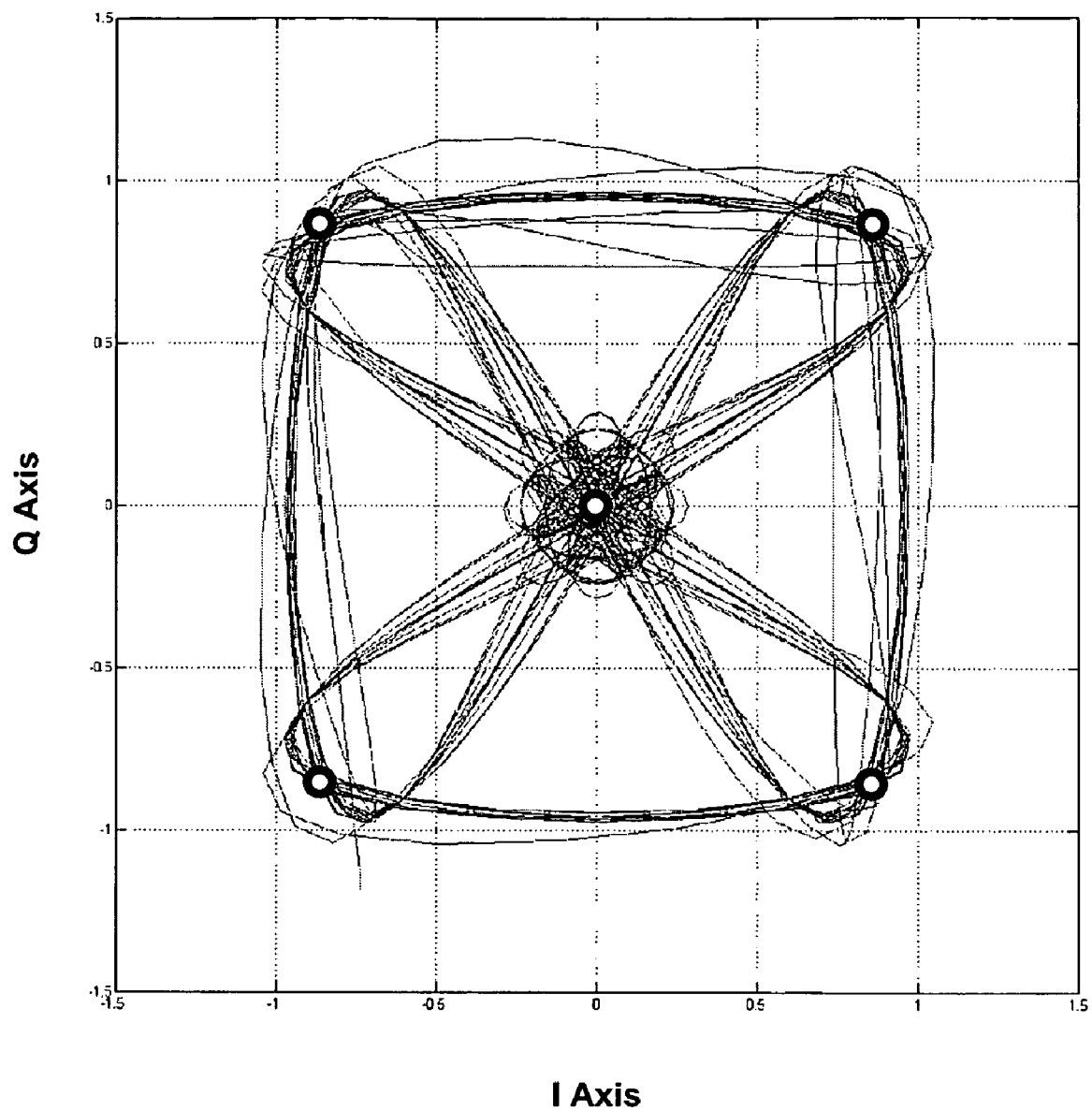
FIG. 5 is an I-Q signal diagram of an exemplary High-Speed Downlink Packet Access (HSDPA) signal having a constellation point centered at the origin.
Figure 6:
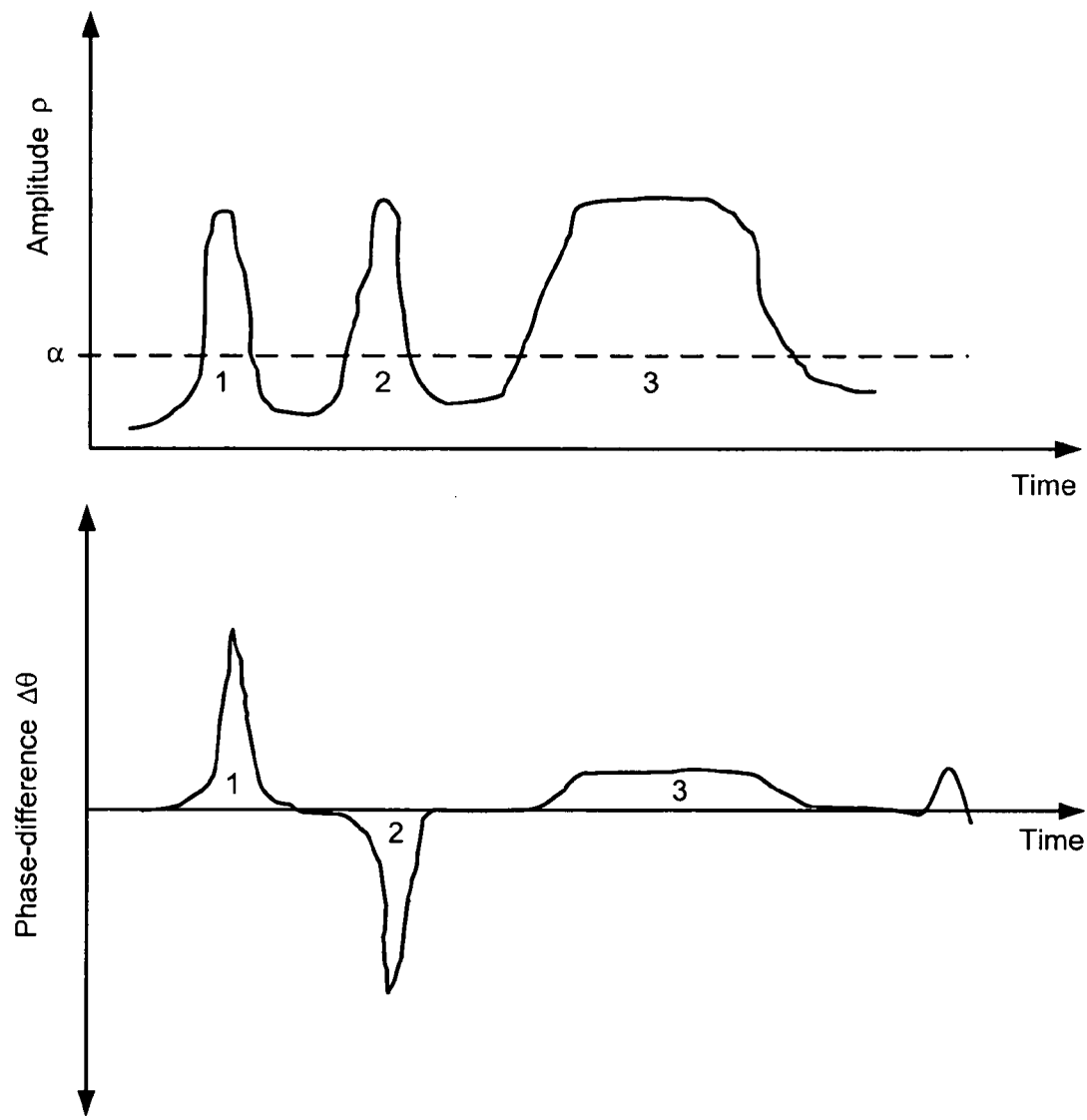
FIG. 6 is a signal diagram of the amplitude and phase-difference components $\rho$ and $\Delta\theta$ of a polar domain signal, highlighting the fact that for some modulation schemes high-frequency events in the phase-difference component $\Delta\theta$ do not correlate with any low-magnitude events in the amplitude component $\rho$.
Figure 7:
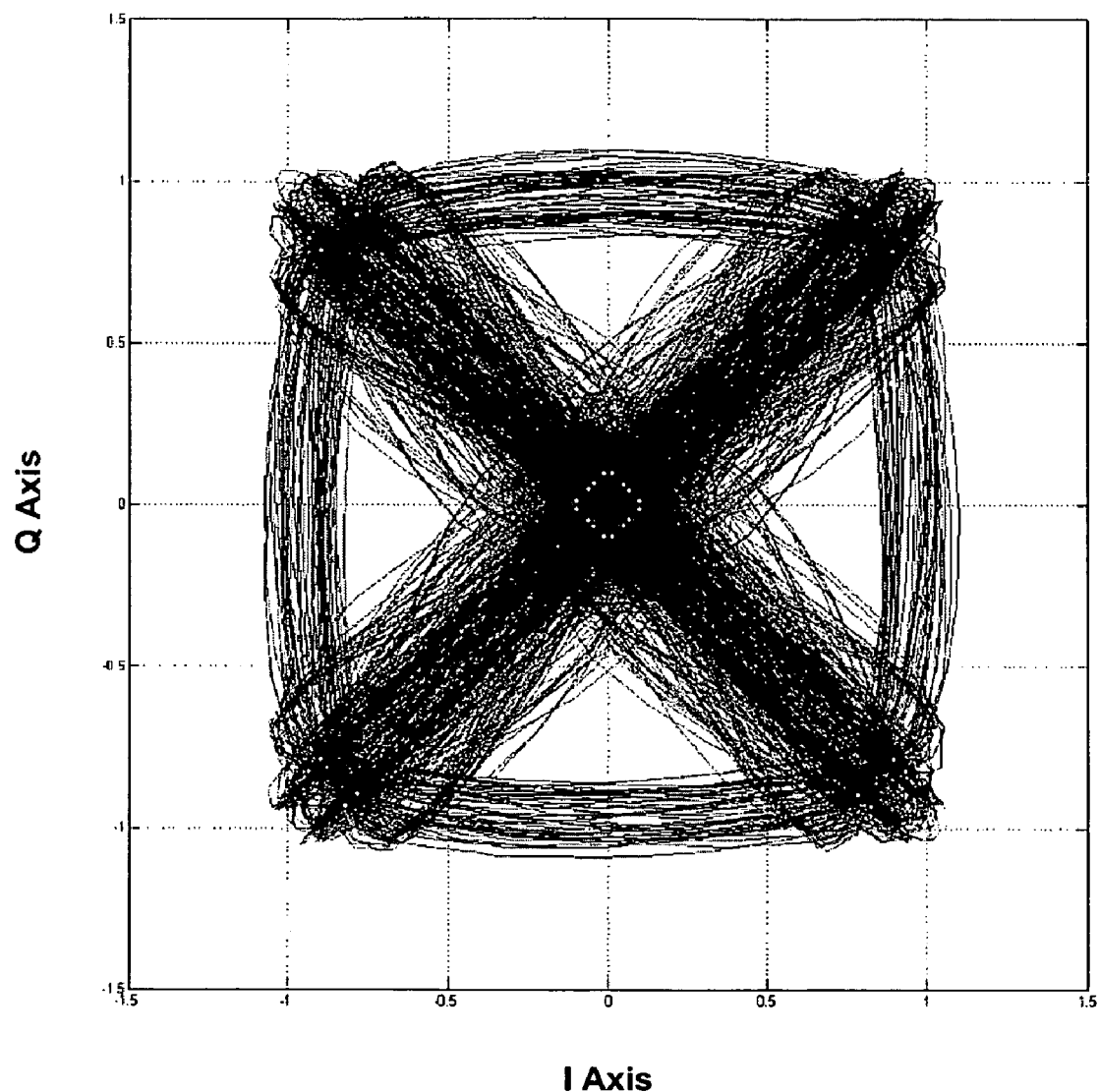
FIG. 7 is an I-Q signal diagram of an exemplary High-Speed Uplink Packet Access (HSUPA) signal displaying high-frequency events occurring between inner constellation points and peripheral constellation points.
Figure 8:
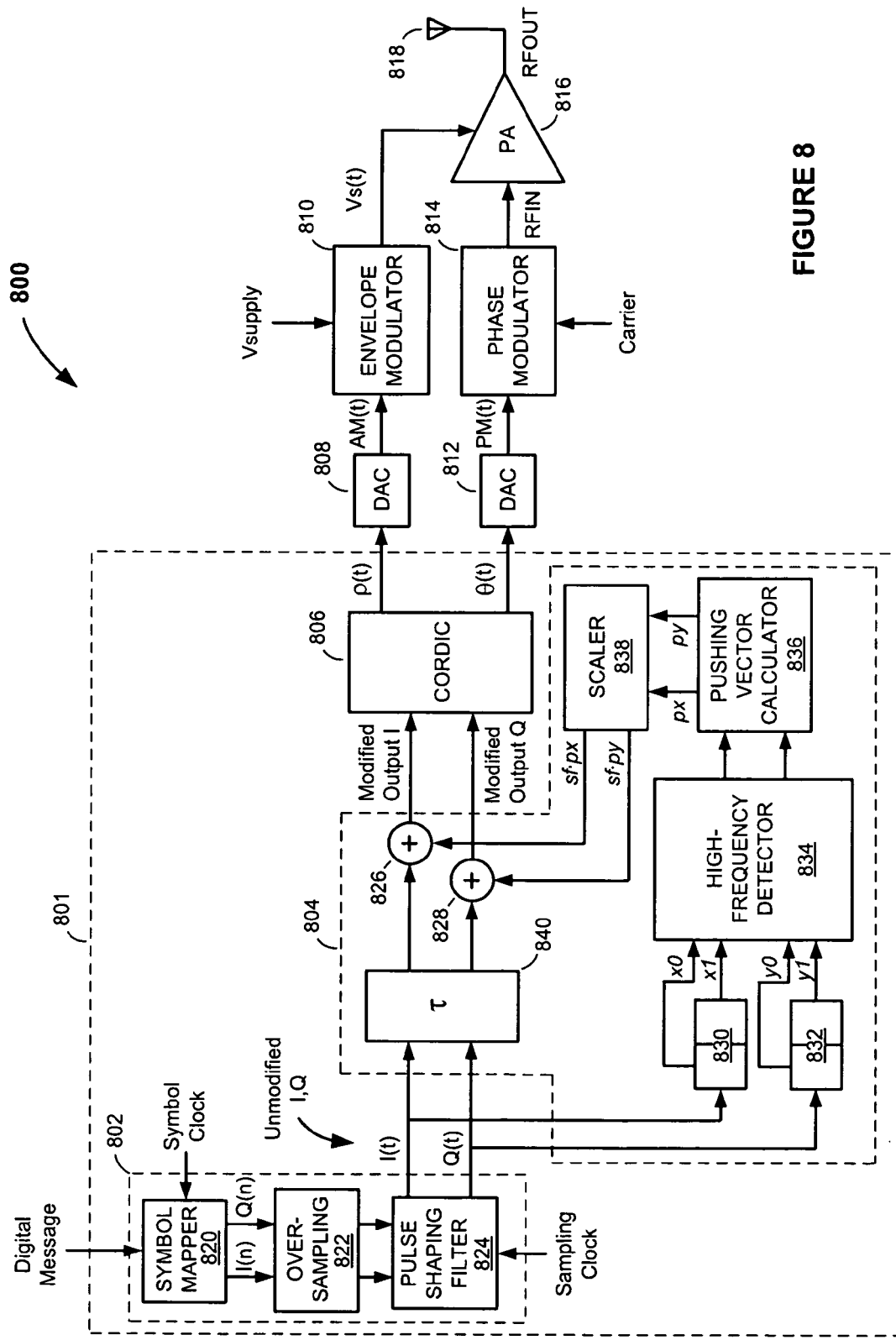
FIG. 8 is a drawing of a polar transmitter having a high-frequency detection and reduction circuit configured in a feed-forward arrangement, according to an embodiment of the present invention.

Referring to FIG. 8, there is shown a polar transmitter 800 configured to reduce high-frequency events in polar domain signals, according to an embodiment of the present invention. The polar transmitter 800 comprises a baseband modulator 802; a high-frequency detection and reduction circuit 804; a rectangular-to-polar converter, such as a Coordinate Rotation Digital Computer (CORDIC) converter 806; an amplitude path including an amplitude path DAC 808 and an envelope modulator 810; a phase path including a phase path DAC 812 and a phase modulator 814; a radio frequency (RF) power amplifier (PA) 816; and an antenna 818.

The baseband modulator 802 comprises a symbol mapper 820, an oversampling block 822 and a pulse shaping filter 824. The symbol mapper 820 is configured to map data bits in a digital message to be transmitted to a signal constellation defined by an applicable non-constant envelope modulation scheme. The data bits are mapped to the signal constellation according to a symbol clock, to produce an in-phase sequence of symbols I(n) and a quadrature phase sequence of symbols Q(n). The oversampling block 822 increases the data rate of the I(n) and Q(n) sequences of symbols by a rate determined by an oversampling clock, to increase resolution and eliminate the need for (or at least relax the requirements of) subsequent reconstruction filters (not shown). The oversampling rate is set to N times the rate of the symbol clock, where N is some positive number greater than one (typically an even integer, e.g., 16 or 32). In one embodiment, the oversampling rate is an even multiple of the chip rate of symbols in a third generation partnership project (3GPP) compatible system (e.g., N times the 3.84 mega-chips per second (Mcps) chip rate in a Universal Mobile Telecommunications System (UMTS) system employing the Wideband Code Division Multiple Access (W-CDMA) air interface). The final component of the baseband modulator 802 is the pulse shaping filter 824. The pulse shaping filter 824 (e.g., a root-raised-cosine filter) operates to shape the oversampled I and Q sequences of symbols so that they are band-limited and to reduce or eliminate inter-symbol interference.

The pulse-shaped signals I(t) and Q(t) produced at the output of the baseband modulator 802 comprise I and Q streams of oversampled data in digital form. In some applications oversampling may not be needed or may be unnecessary. For ease in description, the term "sample" is used herein to refer to I and Q data streams that comprise oversampled data or data that has not been oversampled. Further, to emphasize the distinction between the digital pulse-shaped signals I(t) and Q(t) produced at the output of the baseband modulator 802 and the I and Q signals that have been modified by the high-frequency detection and reduction circuit 804, the former will be referred to as the "unmodified" I and Q signals whereas the latter will be referred to as the "modified" I and Q signals.

The high-frequency detection and reduction circuit 804 has I and Q inputs that are coupled to the I and Q outputs of the baseband modulator 802, and I and Q outputs that are coupled to first and second summers 826 and 828 in a main signal path, respectively. Accordingly, in this exemplary embodiment the high-frequency detection and reduction circuit 804 is configured in a feed-forward arrangement. In an alternative embodiment, described in detail below, a polar transmitter having a high-frequency detection and reduction circuit configured in a feedback arrangement is used.

The high-frequency detection and reduction circuit 804 comprises first and second registers 830 and 832; a high-frequency detector 834; a pushing vector calculator 836; a scaler 838 all configured in a feed-forward signal path; and a delay element 840, and first and second summers 826 and 828 configured in a main signal path. The first and second registers 830 and 832 are configured to receive first and second samples of the unmodified I and Q signals from the output of the baseband modulator 802. The samples are referred to in the description that follows as the "current" sample and the "subsequent" sample, respectively, or, alternatively, by reference to their rectangular coordinates (x0,y0) and (x1,y1). In this exemplary embodiment, the current and subsequent samples are consecutive (i.e., temporally adjacent). However, the subsequent sample may be non-consecutive with respect to the current sample (i.e., may be temporally non-adjacent with respect to the current sample). The x coordinates of the current and subsequent samples (i.e., x0 and x1) are provided to the high-frequency detector 834 via the first register 830, while the y coordinates of the current and subsequent samples (i.e., y0 and y1) are provided to the high-frequency detector 834 via the second register 832. The high-frequency detector operates to analyze the current and subsequent samples to detect and modify samples of the unmodified I and Q signals that are indicative of or correspond to high-frequency events when the signal is expressed in polar coordinates (i.e., after being converted to the polar domain). The pushing vector calculator 836 calculates a pushing vector (px,py) based on the trajectory of the signal between the current and subsequent samples, and the scaler 838 operates to scale the pushing vector (px,py) depending on how close the current sample (x0,y0) is to the origin in the I-Q signal plane (i.e., the complex signal plane) and how fast a signal trajectory between the current sample (x0,y0) and the subsequent sample (x1,y1) changes with time. In one embodiment, described in detail below, the degree to which the pushing vector (px,py) is scaled is made dependent upon the ratio of the magnitude of the current sample (x0,y0) and the magnitude of a trajectory vector (y1-y0,x0-x1) defining the signal trajectory between the current sample (x0,y0) and the subsequent sample (x1, y1).

The scaled pushing vector sf(px,py) produced at the output of the scaler 838 is combined with the unmodified current sample in the main signal path, via the first and second summers 826 and 828, to produce what will be referred to herein as the "modified" I and Q signals. The delay element 840 is used to account for latency in the feed-forward signal path, thereby ensuring that the scaled pushing vector sf(px,py) is combined with the unmodified current sample at the appropriate time. Further details concerning how the high-frequency detection and reduction circuit 804 operates are set forth in the description below.

The CORDIC converter 806 operates to convert the modified I and Q signals from rectangular coordinates to polar coordinates (i.e., from the quadrature domain to the polar domain), to produce digital amplitude and phase component signals ρ(t) and θ(t), which due to prior conditioning in the I-Q domain having reduced high-frequency content in the polar domain.

Collectively, the baseband modulator 802, high-frequency detection and reduction circuit 804 and CORDIC converter 806 comprise the digital baseband circuitry of the polar transmitter 800. In one embodiment, the digital baseband circuitry is implemented as a digital signal processor (DSP), as indicated by the dashed box labeled 801 in FIG. 8. The DSP 801 may comprise hardware (e.g., a microprocessor, microcontroller, other programmable integrated circuit (such as a field-programmable gate array) or an application specific integrated circuit (ASIC)) or a combination of hardware and software, as will be appreciated and understood by those of ordinary skill in the art.

The amplitude and phase path DACs 808 and 812 serve as an interface between the digital baseband circuitry and the analog portions of the polar transmitter 800. Specifically, the amplitude path DAC 808 converts the digital amplitude component signal ρ(t) to an analog amplitude modulation signal AM(t), while the phase path DAC 812 converts the digital phase component signal θ(t) to an analog phase modulation signal PM(t).

The envelope modulator 810, is implemented as a switch-mode power supply (e.g., a Class S modulator), linear regulator or combination of the two, and operates to modulate a direct current power supply voltage Vsupply (e.g., as provided by a battery) according to the amplitude information in the analog amplitude modulation signal AM(t). The resulting amplitude-modulated power supply signal Vs(t) is coupled to the power supply port of the PA 816. Meanwhile, the phase modulator 814 operates to modulate an RF carrier signal according to the phase information in the phase modulation signal PM(t), to produce a phase-modulated RF carrier signal which is coupled to the RF input port RFIN of the PA 816. It should be noted that, although the envelope modulator 810 and phase modulator 814 have been described as being completely analog circuits, they may be alternatively designed using digital circuits or a combination of digital and analog circuits. For example, the phase modulator 814 may be implemented as a phase-accurate frequency locked loop (FLL), such as described in commonly assigned U.S. patent application Ser. No. 12/249,170 entitled "Bandwidth Control in Mostly-Digital PLL/FLL," which is hereby incorporated by reference. When implemented as an FLL, the phase component signal θ(t) is first differentiated to produce a phase-difference signal Δθ(t), which is then applied to the input of the FLL. The phase-difference signal dθ/dt=Δθ(t) has units of frequency (rad/sec) and is representative of the phase difference between successive samples. Accumulation of the phase differences results in the desired phase-accurate result. Hence, depending on the implementation, the input to the phase modulator 814 may be either a phase or phase-difference signal, each of which may be referred to as an "angle" modulation signal that modifies the angle (i.e., the phase or frequency) of the carrier signal during the modulation process.

In the exemplary embodiment shown, the PA 816 is implemented as a switch-mode type of PA (e.g., a Class D, E or F switch-mode PA), operating between compressed and cut-off states. When configured in this manner, the envelope information in the amplitude-modulated power supply signal Vs(t) is restored at the RF output RFOUT of the PA 816, as the PA 816 amplifies the phase-modulated RF carrier signal applied to the RF input RFIN of the PA 816. The desired amplitude- and phase-modulated RF carrier signal appearing at the RF output RFOUT of the PA 816 is coupled to the antenna 818, which finally radiates the signal over the air to a remote receiver.

Figure 9:
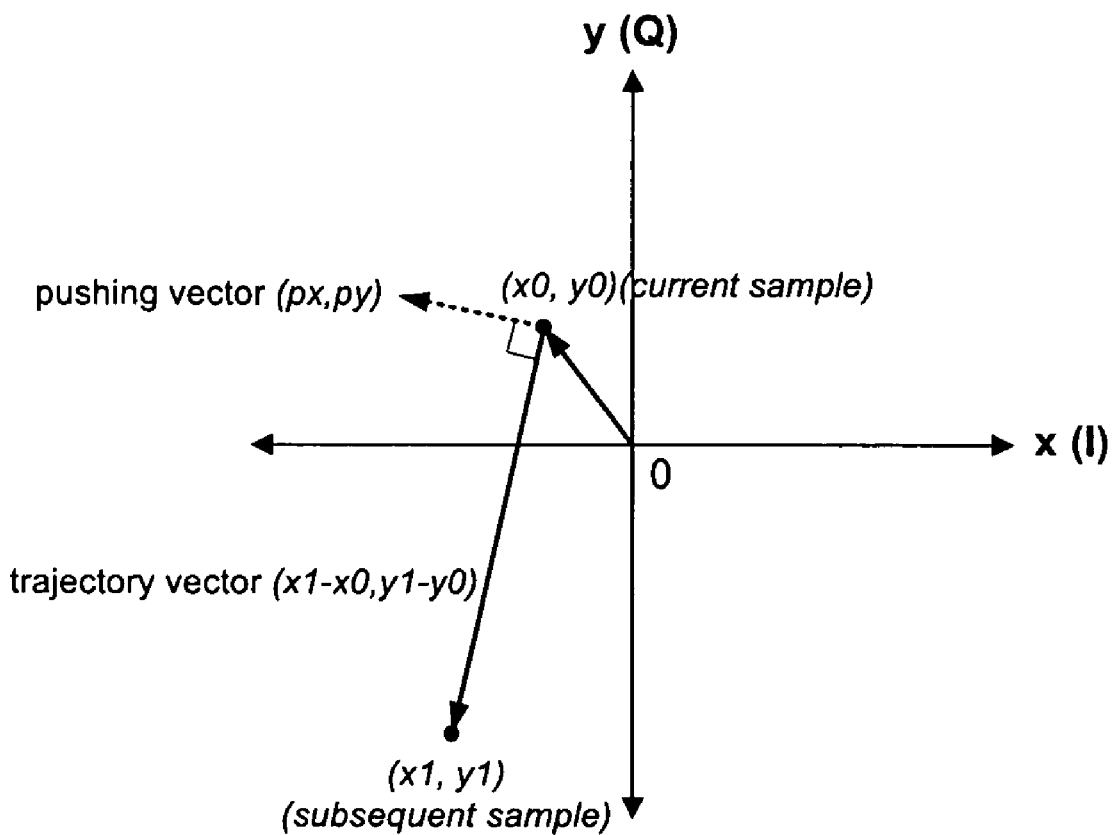
FIG. 9 is a vector diagram illustrating how a pushing vector (px,py) is used to push an unmodified current sample (x0,y0) away from the origin based on the ratio of the magnitude of a current sample (x0,y0) and the magnitude of a trajectory vector (x1-x0,y1-y0) between the current sample and a subsequent sample (x1,y1), according to an embodiment of the present invention.
Figure 10:
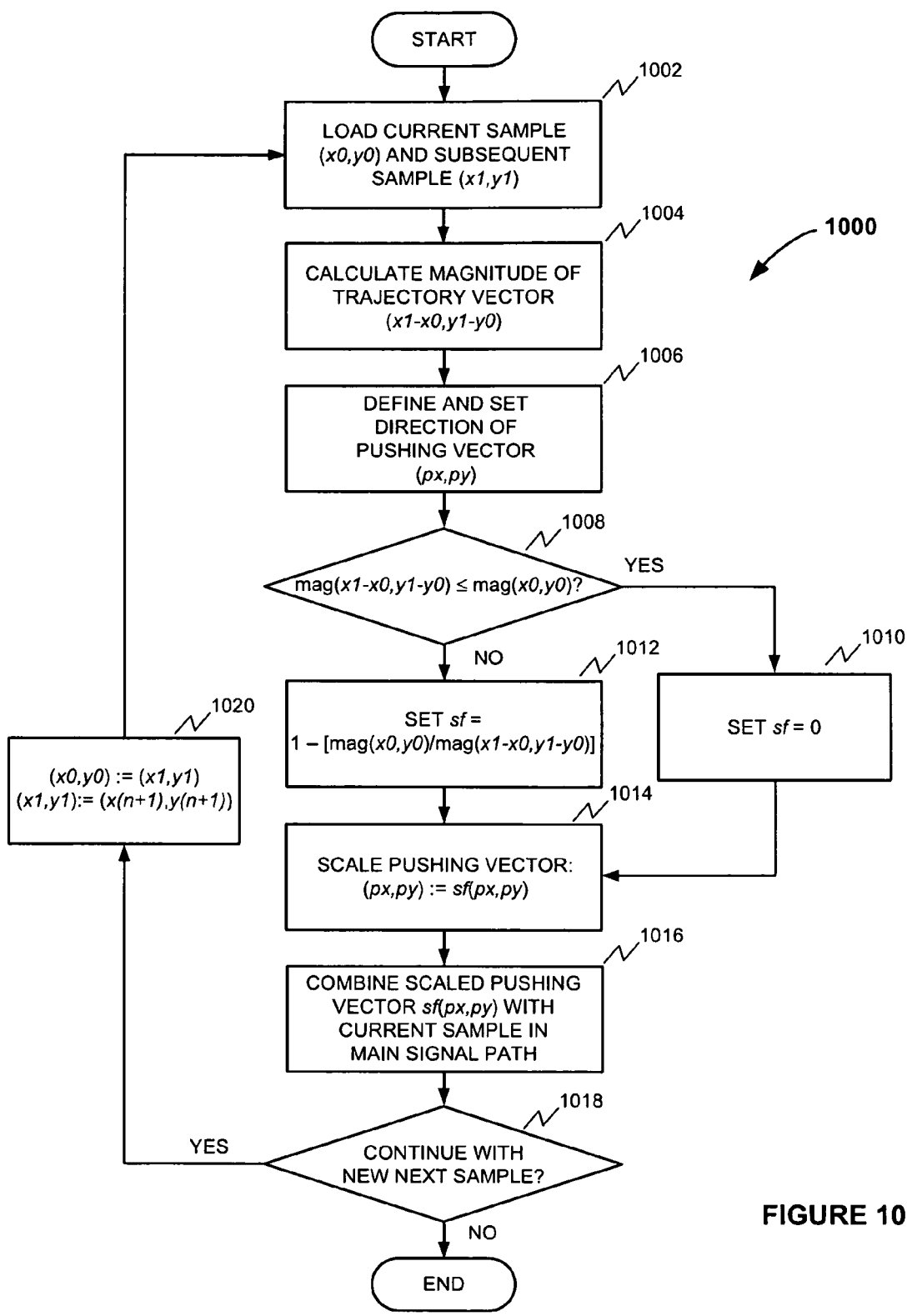
FIG. 10 is a flowchart illustrating a high-frequency detection and reduction method, according to an embodiment of the present invention.

FIGS. 9 and 10 illustrate an exemplary high-frequency detection and reduction method 1000 performed by the high-frequency detection and reduction circuit 804. First, in step 1002 the current sample (x0,y0) and the subsequent sample (x1,y1) are loaded into the high-frequency detector 834, via the first and second registers 830 and 832.

In step 1004 the magnitude mag(x1-x0,y1-y0) of the trajectory vector defining the signal trajectory from the current sample(x0,y0) to the subsequent sample (x1,y1) is calculated.

In step 1006, the appropriate direction of the pushing vector (px,py) is determined and set. The pushing vector (px,py) is orthogonal to the trajectory vector (x1-x0, y1-y0). Since there are two vectors that are orthogonal to the trajectory vector (x1-x0, y1-y0), one having a direction defined by (y1-y0,x0-x1) and the other having a direction defined by (y0-y1, x1-x0), the vector that has an inner product with (x0,y0) that is greater than zero is chosen. This ensures that the signal trajectory is pushed away from the origin, rather than towards it, when the scaled pushing vector sf(px,py) is applied to modify the current sample (x0,y0). Note that when the inner product is zero, either of the directions defined by (y1-y0,x0-x1) or (y0-y1,x1-x0) may be used, e.g., by randomly selecting one of the two directions.

Next, at decision 1008 it is determined whether the magnitude mag(x1-x0,y1-y0) of the trajectory vector is less than, greater than or equal to the magnitude mag(x0,y0) of the current sample. If the magnitude mag(x1-x0,y1-y0) of the trajectory vector is determined to be less than or equal to the magnitude mag(x0,y0) of the current sample, it is an indication that the signal trajectory is slowly changing between the current and subsequent samples. Conversely, if the magnitude mag(x1-x0,y1-y0) of the trajectory vector is determined to be greater than the magnitude mag(x0,y0) of the current sample, it is an indication that the signal trajectory is quickly changing between the current and subsequent samples. A low magnitude mag(x0,y0) of the current sample relative to a high magnitude of the signal trajectory mag(x1-x0,y1-y0) also provides an indication that a high-frequency event would appear in either or both the amplitude and phase component signals ρ(t) and θ(t) if the I and Q signals were not first modified by the high-frequency detection and reduction method 1000 before being converted to the polar domain.

The degree to which the current sample is pushed and the signal trajectory modified is determined by the magnitude of the pushing vector (px,py). Initially, to establish a reference, the magnitude of the pushing vector (px,py) is set to equal the magnitude of the trajectory vector. The pushing vector (px, py) is then scaled according to the value of a scaling factor sf generated in either step 1010 or 1012. Whether step 1010 or step 1012 is performed is determined by the result in decision 1008. If in decision 1008 the magnitude mag(x1-x0,y1-y0) of the trajectory vector was determined to be less than or equal to the magnitude mag(x0,y0) of the current sample (indicative of no high-frequency content between the current and subsequent samples), in step 1010 the scaler 838 sets the scaling factor sf to zero. Alternatively, if in decision 1008 the magnitude mag(x1-x0,y1-y0) of the trajectory vector was determined to be greater than the magnitude mag(x0,y0) of the current sample (indicative of high-frequency content between the current and subsequent samples), at step 1012 the scaler 838 sets the scaling factor sf according to the following formula: sf=1−[mag(x0,y0)/mag(x1-x0,y1-y0)]. Note that the scaling factor sf ranges from zero to one, and is higher the closer the current sample is to the origin and/or the greater the magnitude mag(x1-x0,y1-y0) of the trajectory vector is relative the magnitude mag(x0,y0) of the current sample.

It should be noted that to reduce the computational load of the underlying hardware (or ease the design requirements of the hardware needed to calculate the scaling factor sf) in one embodiment the scaling factor sf is determined in a discrete fashion. Specifically, the square of the magnitude of the trajectory vector (i.e., $[mag(x1-x0,y1-y0)]^2$) is divided into several segments. Then, a value for the scaling factor sf is assigned depending on which segment the square of the magnitude of the present sample (i.e., $[mag(x0,y0)]^2$) falls in. For example, in one exemplary embodiment, the square of the magnitude of the trajectory vector is divided into seven discrete segments and the scaling factor is set as follows:

if $(mag(x0,y0))^2$ is in $[0, (mag(x1-x0,y1-y0))^2/64)$, set $sf=\frac{1}{2}+\frac{1}{4}+\frac{1}{8}+\frac{1}{32}$;

if $(mag(x0,y0))^2$ is in $[(mag(x1-x0,y1-y0))^2/64, (mag(x1-x0,y1-y0))^2/32)$, set $sf=\frac{1}{2}+\frac{1}{8}+\frac{1}{16}+\frac{1}{32}$;

if $(mag(x0,y0))^2$ is in $[(mag(x1-x0,y1-y0))^2/32, (mag(x1-x0,y1-y0))^2/16)$, set $sf=\frac{1}{2}+\frac{1}{8}$;

if $(mag(x0,y0))^2$ is in $[(mag(x1-x0,y1-y0))^2/16, (mag(x1-x0,y1-y0))^2/8)$, set $sf=\frac{1}{2}+\frac{1}{32}+\frac{1}{64}$;

if $(mag(x0,y0))^2$ is in $[(mag(x1-x0,y1-y0))^2/8, (mag(x1-x0,y1-y0))^2/4)$, set $sf=\frac{1}{4}+\frac{1}{8}+\frac{1}{16}+\frac{1}{32}$;

if $(mag(x0,y0))^2$ is in $[(mag(x1-x0,y1-y0))^2/4, (mag(x1-x0,y1-y0))^2/2)$, set $sf=\frac{1}{4}+\frac{1}{16}+\frac{1}{32}$;

if $(mag(x0,y0))^2$ is in $[(mag(x1-x0,y1-y0))^2/2, (mag(x1-x0,y1-y0))^2)$, set $sf=\frac{1}{4}$.

Based on the value of the scaling factor sf determined in steps 1010 or 1012, in step 1014 the scaler 838 scales the pushing vector (px,py) so that it has new, scaled coordinates (px,py):=sf(px,py).

In step 1016 the scaled pushing vector sf(px,py) is combined with the unmodified current sample in the main signal path, via the first and second summers 826 and 828, and the modified I and Q signals are finally presented to the CORDIC converter 806, which as explained above converts the modified I and Q signals to polar domain signals.

Following step 1016, decision 1018 determines whether to repeat the high-frequency detection and reduction method 1000 on new samples. If no further correction is to ensue, the method 1000 ends. Otherwise, at step 1020 the subsequent sample (x1,y1) is designated as the new current sample (i.e., (x0,y0):=(x1,y1)), a new subsequent sample (i.e., (x1,y1):=(x(n+1),y(n+1)), where n=1, 2, 3 . . . ) is loaded from the baseband modulator 802 into the high-frequency detection and reduction circuit 804 at step 1002, and the remaining steps in the method 1000 are repeated using the new current sample and the new subsequent sample.

Figure 11:
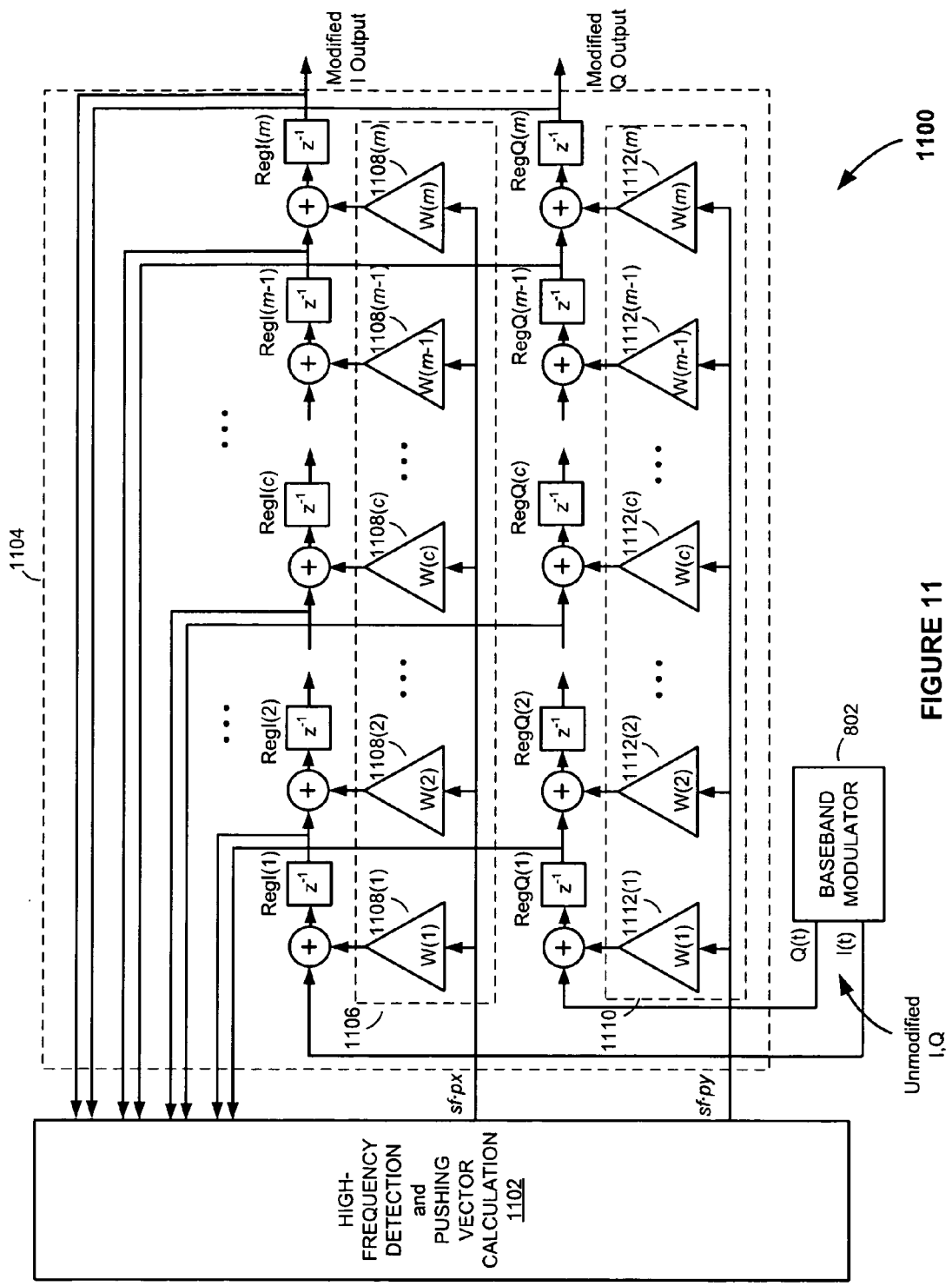
FIG. 11 is a high-frequency and detection and reduction circuit that operates on previously modified samples and which may be employed in a feedback arrangement in the polar transmitter in FIG. 8, in lieu of the feed-forward high-frequency detection and reduction circuit, according to an embodiment of the present invention.

In the exemplary embodiment described above, the high-frequency detection and reduction circuit 804 is configured in a feed-forward arrangement and high-frequency detection and reduction are performed without taking into account samples in the I(t) and Q(t) signals that have been previously modified. FIG. 11 shows an alternative high-frequency detection and reduction circuit 1100, which employs feedback of previously-modified samples. The high-frequency detection and reduction circuit 1100 comprises a high-frequency detection and pushing vector calculation block 1102 and a high-frequency reduction circuit 1104, which like the previously-described embodiment are formed in a DSP comprised of hardware or a combination of hardware and software.

The high-frequency detection and pushing vector calculation block 1102 operates to detect modified and to-be-modified samples that correspond to high-frequency events in the polar domain, and generate a scaled pushing vector sf(px,py), using the methods described above.

The high-frequency reduction circuit 1104 includes an I branch and a Q branch. The I branch includes a first plurality of registers RegI(1), RegI(2), . . . , RegI(c), . . . , RegI(m) and an I-branch correction pulse generator 1106 having a plurality of multipliers 1108(1), 1108(2), . . . , 1108(c), . . . , 1108(m) that are individually weighted by a plurality of weighting coefficients W(1), W(2), . . . , W(c), . . . , W(m), where m is a positive integer and c is a positive integer greater than one and less than m. The Q branch includes a second plurality of registers RegQ(1), RegQ(2), . . . , RegQ(c), . . . , RegQ(m) and a Q-branch correction pulse generator 1110 having a plurality of multipliers 1112(1), 1112(2), . . . , 1112(c), . . . , 1112(m) that are weighted by the same plurality of weighting coefficients W(1), W(2), . . . , W(c), . . . , W(m).

The plurality of weighting coefficients W(1), W(2), . . . , W(c), . . . , W(m) determine the shape of the correction pulses generated by the I-branch and Q-branch correction pulse generators 1106 and 1110. In one embodiment, the weights of the weighting coefficients W(1), W(2), . . . , W(c), . . . , W(m) are set so that the correction pulses generated by the I- and Q-branch correction pulse generators 1106 and 1110 are symmetric, with c representing the center of the correction pulses. The weighting coefficients W(1), W(2), . . . , W(c), . . . , W(m) may be set so that the correction pulses are triangular, Gaussian, root-raised cosine, or other predefined shape that results in a desired balance or combination of in-band and out-of-band performance metrics, such as error vector magnitude (EVM) and adjacent channel leakage ratio (ACLR).

The first plurality of registers RegI(1), RegI(2), . . . , RegI(c), . . . , RegI(m) in the I-branch is configured to store modified x-coordinate samples of the modified I(t) signal. The second plurality of registers RegQ(1), RegQ(2), . . . , RegQ(c), . . . , RegQ(m) in the Q branch is configured to store modified y-coordinate samples of the modified Q(t) signal. The registers RegI(c-1) and RegQ(c-1) are configured to store the current sample (x0,y0), which in this case has been previously modified. The registers immediately preceding registers RegI(c-1) and RegQ(c-1), i.e., RegI(c-2) and RegQ(c-2), are configured to store the subsequent sample (x1,y1). Samples following the subsequent sample (x1,y1) are stored in registers RegI(1) and RegQ(1) through registers RegI(c-3) and RegQ(c-3), and samples prior to the current sample (x0,y0) are stored in registers RegI(c) and RegQ(c) through RegI(m) and Reg(m).

The modified x-coordinate samples stored in the first plurality of registers RegI(1), RegI(2), ..., RegI(c), ..., RegI(m) are formed by summing modified and to-be-modified x-coordinate samples with a scaled I-branch correction pulse. The scaled I-branch correction pulse is formed by scaling the weighting coefficients W(1), W(2), ..., W(c), ..., W(m) of the I-branch correction pulse generator 1106 by the scaled x-coordinate sample of the scaled pushing vector, i.e., by sf·px. The modified y-coordinate samples stored in the second plurality of registers RegQ(1), RegQ(2), ..., RegQ(c), ..., RegQ(m) are formed by summing modified and to-be-modified y-coordinate samples with a scaled Q-branch correction pulse. Similar to forming the I-branch correction pulse, the scaled Q-branch correction pulse is formed by scaling the weighting coefficients W(1), W(2), ..., W(c), ..., W(m) of the Q-branch correction pulse generator 1110 by the scaled y-coordinate sample of the scaled pushing vector, i.e., by sf·py.

As the high-frequency detection and reduction circuit 1100 operates, modified x-coordinate samples of the I(t) signal stored in the first plurality of registers RegI(1), RegI(2), ..., RegI(c), ..., RegI(m) and modified y-coordinate samples of the Q(t) signal stored in the second plurality of registers RegQ(1), RegQ(2), ..., RegQ(c), ..., RegQ(m) are fed back to the high-frequency detection and pushing vector calculation block 1102. The high-frequency detection and pushing vector calculation block 1102 responds by once again: detecting high-frequency event indicators among the modified and to-be-modified samples, determining the appropriate insertion time for the next correction pulses, and calculating a new scaling factor sf for the pushing vector (px,py). At the same time, modified I and Q signals appearing at the output of the high-frequency reduction circuit 1104 are presented to the CORDIC converter 806 in the main signal path, which then converts the modified I and Q signals to polar coordinates.

After each modification of the x-coordinate and y-coordinate samples of the I(t) and Q(t) signals, the modified x-coordinate samples stored in the first plurality of registers RegI(1), RegI(2), ..., RegI(c), ..., RegI(m) and the y-coordinate samples stored in the second plurality of registers RegQ(1), RegQ(2), ..., RegQ(c), ..., RegQ(m) are updated by adding the scaled first and second correction pulses to the stored samples and then shifting the individually summed results from left to right into adjacent registers on the next clock cycle. For example, the W(c-1)-weighted portions of the scaled correction pulses generated by the I-branch and Q-branch correction pulse generators 1106 and 1110 are added to the x- and y-coordinates of the subsequent sample stored in registers RegI(c-2) and RegQ(c-2) and the summed result is then moved into registers RegI(c-1) and RegQ(c-1). Meanwhile, the W(1)-weighted portions of the scaled correction pulses generated by the I-branch and Q-branch correction pulse generators 1106 and 1110 are added to the x- and y-coordinates of a new sample and the summed result is then moved into the first registers RegI(1) and RegQ(1). With the values of the registers being continually updated, and fed back to the high-frequency detection and pushing vector calculation block 1102, high-frequency detection and reduction is performed on previously modified samples, thereby achieving greater accuracy in high-frequency reduction than the feed-forward arrangement.

Figure 12:
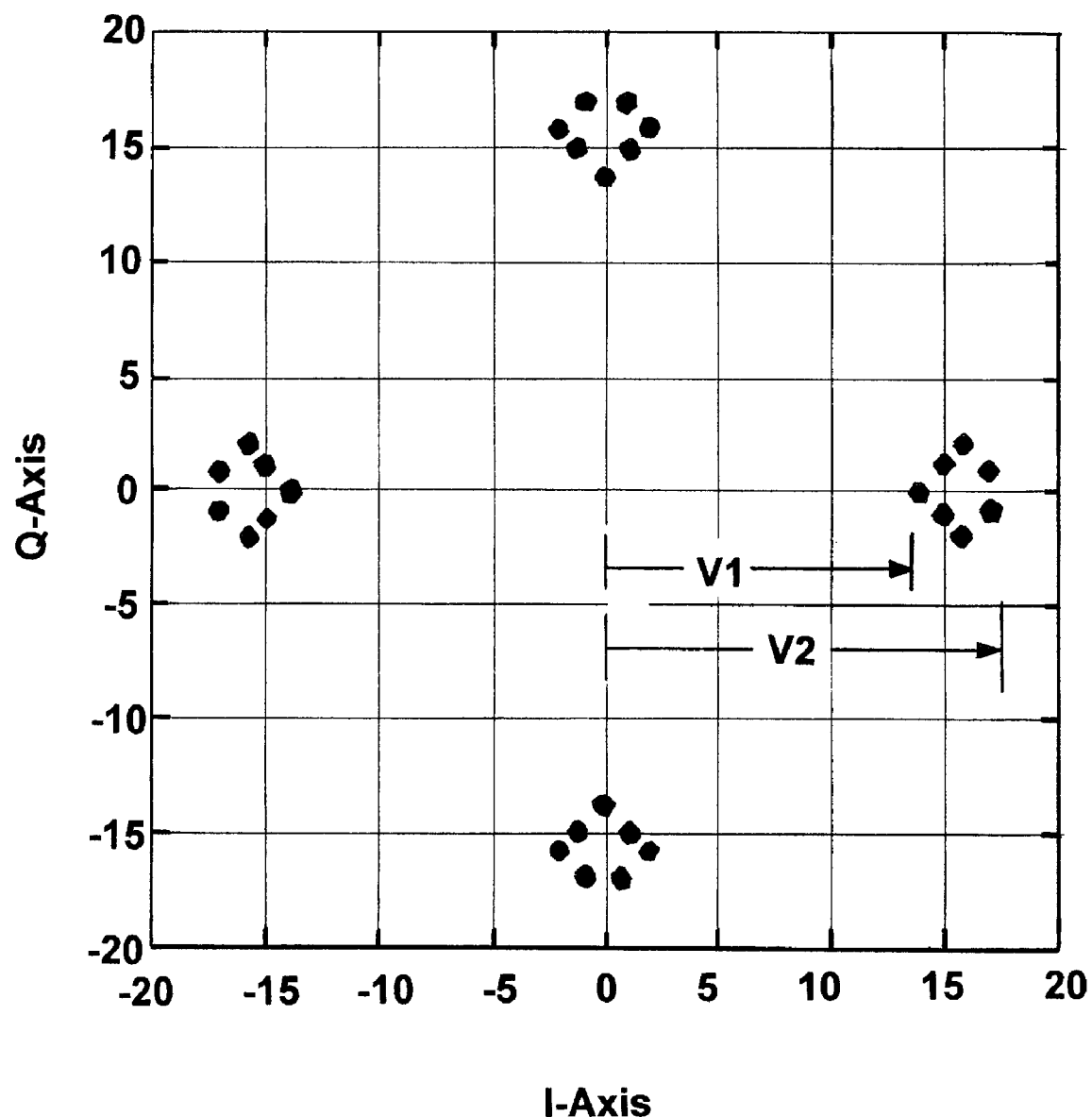
FIG. 12 is a drawing of a signal constellation type in which a second scaling factor is calculated to further scale the magnitude of the pushing vector beyond that provided for by application of the method in FIG. 10, according to an embodiment of the present invention.

Depending on the modulation scheme being employed, the scaling factor calculation performed in step 1012 of the high-frequency detection and reduction method 1000 may underestimate the degree to which the pushing vector (px,py) should be scaled in order to most effectively reduce high-frequency content in the polar domain signals. For example, for modulation formats having signal constellations with tightly clustered constellation points, such as the signal constellation shown in FIG. 12, enhanced modification can be achieved by considering a greater number of samples, rather than just the current sample (x0,y0) and the next sample (x1,y1). Specifically, a sample (fx,fy) that leads the current sample (x0,y0) by N/2 time units, and a sample (dx,dy) that lags the current sample (x0,y0) by N/2 time units (where N is the oversampling rate over the symbol rate) are defined. In a signal trajectory in which the leading sample (fx,fy) falls within one signal constellation cluster and the lagging sample (dx,dy) falls within a diametrically-opposed signal constellation cluster, the current sample (x0,y0) in the signal trajectory is very close to the origin. This condition is indicative of a high-frequency event in the polar domain signals. In such situations, the scaling factor sf determined by the method 1000 above may not be as large as desired or needed to most effectively reduce high-frequency content in the polar domain signals. To correct for this deficiency, a second scaling factor sfa is computed and then multiplied by the previously-scaled pushing vector (px,py) as follows. First, the smallest- and largest-magnitude constellation points are identified, as shown in FIG. 12. V1 is designated as the magnitude of the smallest-magnitude constellation point and V2 is designated as the magnitude of the largest-magnitude constellation point. Then, the second scaling factor sfa is calculated, according to the following method;

```
if (fx>V2 && dx<V2)||(fx<-V2 && dx>V2)||
   (fy>V2 && dy<-V2)||(fy<-V2 && dy>V2)
    sfa = 1;
elseif (fx>V1 && dx<-V1)||(fx<-V1 && dx>V1)||
   (fy>V1 && dy<-V1)||(fy<-V1 && dy >V1)
    sfa = 1 + δsf;
else
    sfa = 1;
end,
``` where the symbols && and || mean "and" and "or" and δsf is the a scaling factor increment having a previously defined value based on a desired or required out-of-band metric such as ACLR, in relation to a desired or required in-band performance metric, such as EVM. In one embodiment, δsf is set to $\frac{1}{16}$, as it was shown to provide the desired further reduction in high-frequency content without unduly increasing EVM.

After the second scaling factor sfa is calculated, it is used to scale the pushing vector (px,py) that was previously scaled by the first scaling factor sf. In other words, the pushing vector determined in step 1014 of the method in FIG. 10 is further scaled by the second scaling factor sfa, resulting in a new pushing vector: (px,py):=sfa(px,py).

Depending on the application, it may not be necessary to modify the I and Q signal samples (i.e., insert correction pulses) at the rate of the sampling clock. In one embodiment of the invention, consecutive pushing vectors (px1,py1) and (px2,py2) are computed, and the one having the larger magnitude is used to push the signal trajectory only once. The other is not used. In another embodiment, a sequence of pushing vectors, i.e., (px1,py1), (px2,py2), (px3,py3) . . . etc. is calculated until a local pushing vector magnitude is found. The pushing vector corresponding to the local maximum is used to push the signal trajectory, and the others are not used. By inserting correction pulses at a rate less than the rate of the sampling clock, energy consumption is reduced. In one embodiment, the correction pulse insertion rate is reduced to a rate equal to ⅙ the sampling clock rate. Measurements have shown that a significant reduction in energy consumption is achieved using this technique, with little degradation in high-frequency reduction performance.

Figure 13B:
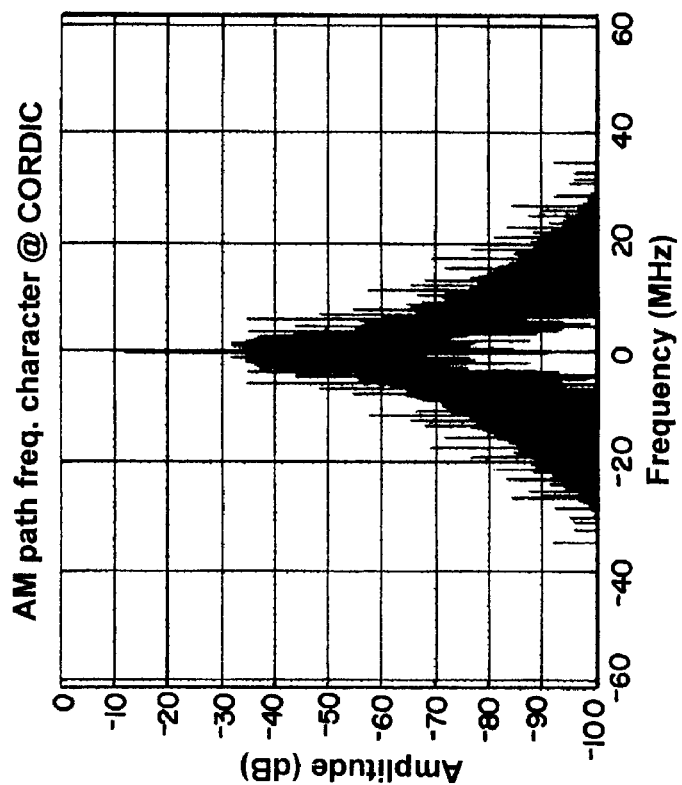
FIGS. 13A and 13B are diagrams comparing the power spectral density (PSD) of an amplitude modulation signal AM(t) derived from an HSUPA signal that has not been conditioned by the high-frequency detection and reduction method of the present invention (FIG. 13A) to the PSD of the amplitude modulation signal AM(t) after having been conditioned by the high-frequency detection and reduction method of the present invention (FIG. 13B)
Figure 13A:
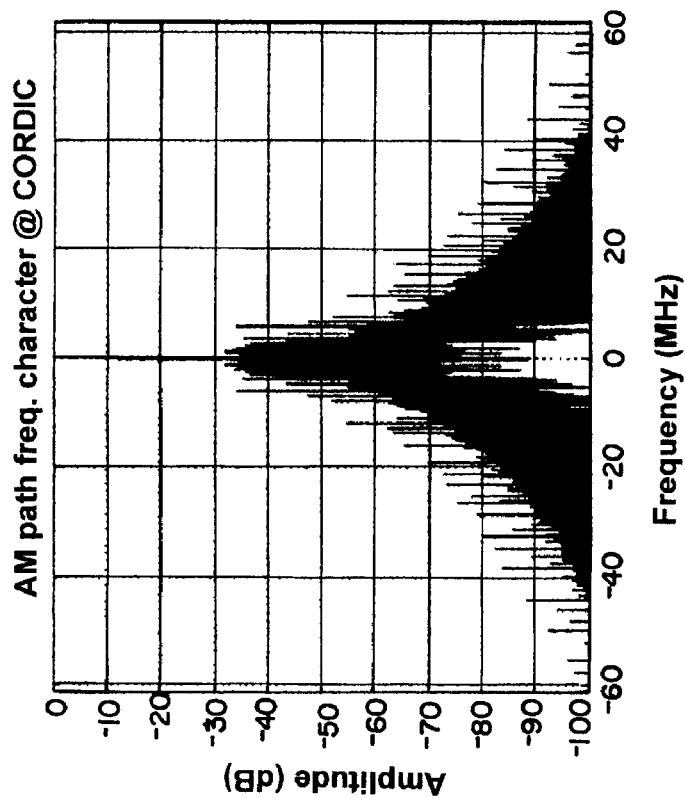
Figure 14B:
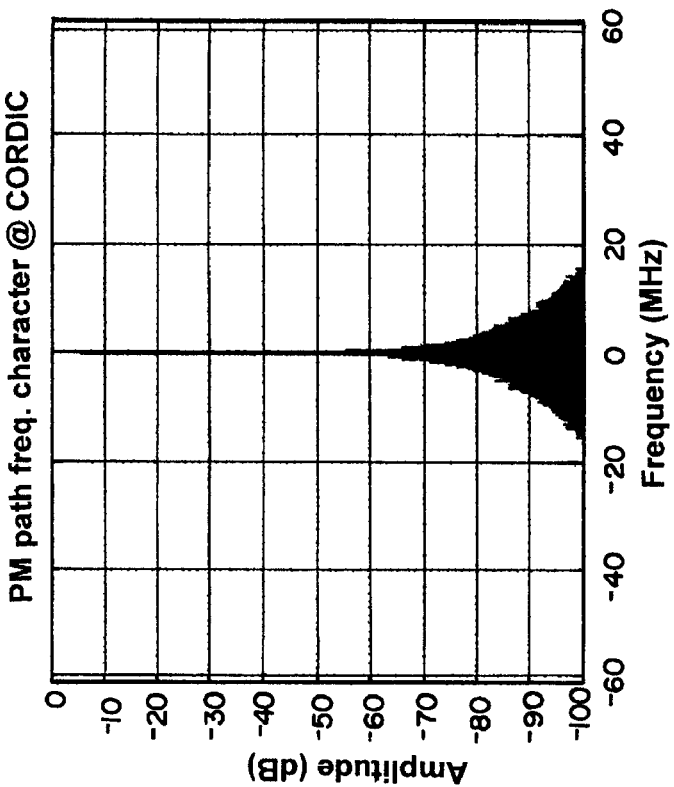
FIGS. 14A and 14B are PSD diagrams comparing the PSD of the phase modulation signal PM(t) derived from an HSUPA signal that has not been conditioned by the high-frequency detection and reduction method of the present invention (FIG. 14A) to the PSD of the phase modulation signal PM(t) after having been conditioned by the high-frequency detection and reduction method of the present invention (FIG. 14B).
Figure 14A:
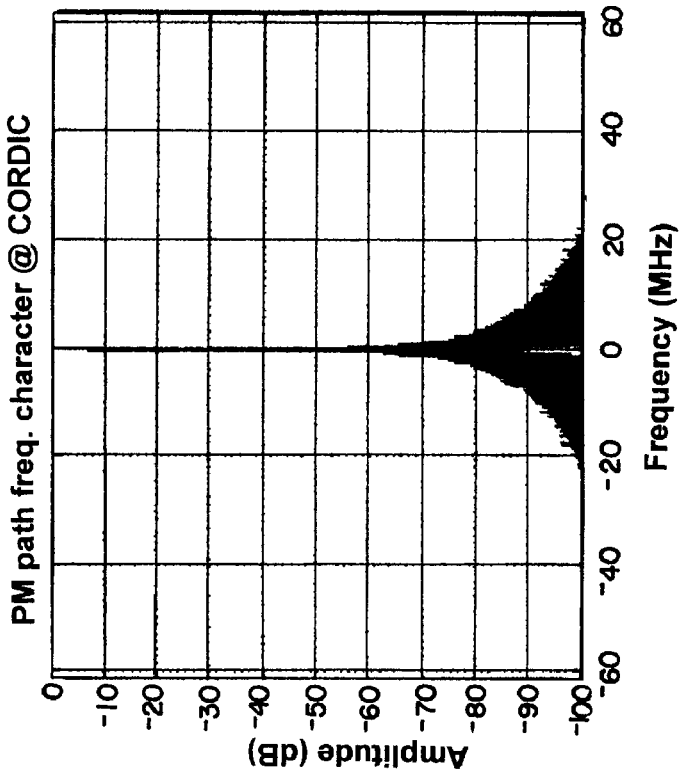

Simulation results have demonstrated that the methods and apparatus of the present invention are effective at reducing high-frequency events in both the amplitude and phase component signals ρ(t) and θ(t). FIGS. 13A and 13B are diagrams comparing the power spectral density (PSD) of an amplitude modulation signal AM(t) derived from an HSUPA signal that has not been conditioned by the high-frequency detection and reduction method of the present invention (FIG. 13A) to the PSD of the amplitude modulation signal AM(t) after having been conditioned by the high-frequency detection and reduction method of the present invention (FIG. 13B). It is seen that high-frequency content in the AM(t) signal is noticeably lower when the HSUPA is conditioned by the high-frequency detection and reduction method of the present invention than it is without application of the method. FIGS. 14A and 14B compare the PSDs of the phase modulation signal PM(t) of the same HSUPA signal with (FIG. 14B) and without (FIG. 14A) application of the high-frequency detection and reduction method of the present invention. Like the AM(t) signal, high-frequency content in the PM(t) is noticeably lower when the HSUPA is conditioned by the high-frequency detection and reduction method of the present invention than it is without application of the method.

Quantitative simulation and measurement data also demonstrate that application of the high-frequency detection and reduction method of the present invention results in a substantial reduction in adjacent channel interference with minimal impact on modulation accuracy and in-band distortion. ACLRs of −48.6 and −56.3 dBc at ±5 and ±10 MHz offsets from the carrier frequency (ACLR5 and ACLR10) were realized with application of the high-frequency detection and reduction method of the present invention. These ACLR values are significantly lower than the 3GPP user equipment (UE) ACLR limits of −33 dBc and −43 dBc, respectively. The root-mean-square (RMS) EVM in the measurement was also shown to be no greater than about 4.3%, and maintained at a value less than the 3GPP peak EVM limit of 17.5% at all times.

While the methods and apparatus of the invention are subject to various modifications and alternative forms, specific embodiments have been shown by way of example in the drawings and described in detail herein. However, it should be understood that the methods and apparatus of the invention are not limited to the particular forms disclosed. Rather, they encompass all modifications, equivalents, and alternatives that fall within the spirit and scope of the invention as defined in the appended claims.

What is claimed is:

1. A baseband circuit, comprising:
   a baseband modulator configured to generate rectangular-coordinate in-phase (I) and quadrature phase (Q) signals from a digital message to be transmitted, in accordance with a predetermined modulation scheme;
   high-frequency detection and reduction means configured to detect a first sample of said digital I and Q signals that corresponds to a high-frequency event in the polar domain, modify said first sample based on both how close said first sample is to the origin of the I-Q signal plane and how fast a signal trajectory between said first sample and a subsequent sample changes, and
   based on a magnitude of said first sample and a magnitude of a trajectory vector define the signal trajectory between said first sample and said subsequent sample,
   wherein said high-frequency detection and reduction means is configured to define a pushing vector for pushing said first sample away from the origin in the I-Q signal plane, and to calculate a scaling factor for scaling said pushing vector, said scaling factor having a value dependent on the magnitude of said first sample and the magnitude of said trajectory vector,
   wherein said high-frequency detection and reduction means is further configured to:
   define a symbol interval around said first sample, said symbol interval including a leading sample that is N/2 time units earlier than said first sample and a lagging sample that is N/2 time units later than said first sample, where N represents an oversampling rate of samples of the I and Q signals over a symbol rate; and
   calculate a second scaling factor for scaling said pushing vector, said second scaling factor having a value that is determined based on positions of the leading and lagging samples among signal constellation points in a signal constellation representative of said predetermined modulation scheme; and
   a rectangular-to-polar converter configured to convert I and Q signals that have been modified by said high-frequency detection and reduction means to polar domain signals having polar-coordinates.

2. The baseband circuit of claim 1 wherein modifying said first sample comprises modifying both the magnitude and angle of a vector defining said first sample.

3. The baseband circuit of claim 1 wherein said high-frequency detection and reduction means is configured in a feed-forward arrangement between said baseband modulator and said rectangular-to-polar converter.

4. The baseband circuit of claim 1 wherein said high-frequency detection and reduction means is configured in a feedback arrangement between said baseband modulator and said rectangular-to-polar converter.

5. The baseband circuit of claim 4 wherein said high-frequency detection and reduction means includes a correction pulse generator configured to generate a pulse for modifying said first sample and samples prior to and subsequent to said first sample.

6. The baseband circuit of claim 5 wherein said high-frequency detection and reduction means is configured to generate a scaled pushing vector having a magnitude that is dependent on a magnitude of a previously modified sample.

7. The baseband circuit of claim 6 wherein said correction pulse generator comprises a digital circuit having weighted coefficients.

8. The baseband circuit of claim 7 wherein said high-frequency detection and reduction means is configured to scale said weighted coefficients according to said scaled pushing vector.

9. A transmitter including the baseband circuit claimed in claim 1.

10. A method of reducing high-frequency events in a polar domain signal, comprising:
    generating an unmodified rectangular-coordinate signal, with a modulator, having in-phase (I) and quadrature phase (Q) components modulated according to a predetermined modulation scheme;

detecting, with a high-frequency detection and reduction unit configured to detect a first sample of the signal having in phase (I) and quadrature phase (Q) components;

modifying the first sample of said unmodified rectangular-coordinate signal based on how close said first sample is to the origin in a complex signal plane and how fast a signal trajectory between said first sample and a subsequent sample changes, to produce a modified rectangular-coordinate signal by calculating a magnitude of a trajectory vector defining said signal trajectory between said first sample and a subsequent sample and modifying said first sample based on a magnitude of said first sample and a magnitude of said trajectory vector, wherein modifying said first sample comprises determining a pushing vector for pushing said first sample away from the origin in the complex signal plane and scaling said pushing vector depending on the magnitude of said first sample and the magnitude of said trajectory vector by defining a symbol interval around said first sample, said symbol interval including a leading sample that is N/2 time units earlier than said first sample and a lagging sample that is N/2 units later than said first sample, where N represents an oversampling rate of samples of the I and Q signals over a symbol rate;

scaling said pushing vector based on positions of the leading and lagging samples among signal constellation points in a signal constellation representative of said predetermined modulation scheme; and converting said modified rectangular-coordinate signal to a polar domain signal having amplitude and phase components, wherein by modifying said first sample, either or both the amplitude and phase components of said polar domain signal have reduced high-frequency content compared to a polar domain signal that would be generated without said first sample having been first modified.

11. The method of claim 10 wherein modifying said first sample comprises modifying both the magnitude and angle of a vector defining said first sample.

12. The method of claim 10 wherein modifying said first sample comprises generating a scaled pushing vector for pushing said first sample away from the origin of the complex signal plane.

13. The method of claim 12 wherein generating said scaled pushing vector comprises generating a pushing vector having a magnitude that is dependent on a magnitude of a previously modified sample.

14. The method of claim 13 modifying said first sample comprises generating a correction pulse for modifying said first sample and samples prior to and subsequent to said first sample.

15. The method of claim 14 wherein generating said correction pulse comprises digitally modifying said first sample and said samples prior to and subsequent to said first sample.

16. The method of claim 15 wherein digitally modifying said first sample and said samples prior to and subsequent to said first sample comprises:

generating a digital correction pulse having weighted coefficients; and scaling said weighted coefficients according to said scaled pushing vector.

* * * * *